US008755373B1

(12) United States Patent
Cowick

(10) Patent No.: US 8,755,373 B1
(45) Date of Patent: *Jun. 17, 2014

(54) VOP (VOICE OVER PACKET) AUTOMATIC CALL DISTRIBUTION

(75) Inventor: Dennis E. Cowick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/163,040

(22) Filed: Jun. 17, 2011

Related U.S. Application Data

(63) Continuation of application No. 11/531,864, filed on Sep. 14, 2006, now Pat. No. 8,000,317.

(51) Int. Cl.
*H04L 12/66* (2006.01)
*H04M 7/00* (2006.01)

(52) U.S. Cl.
CPC .................................... *H04M 7/006* (2013.01)
USPC ......................................................... 370/352

(58) Field of Classification Search
CPC ..................................................... H04M 7/006
USPC ......................................................... 370/352
See application file for complete search history.

(56) References Cited

U.S. PATENT DOCUMENTS

| | | | |
|---|---|---|---|
| 6,430,174 B1 | 8/2002 | Jennings et al. | |
| 6,678,266 B1 | 1/2004 | Hollatz et al. | |
| 6,816,579 B2 | 11/2004 | Donovan et al. | |
| 7,382,868 B2 | 6/2008 | Moore et al. | |
| 7,415,029 B1 * | 8/2008 | Hyams et al. | 370/401 |
| 2002/0141352 A1 | 10/2002 | Fangman et al. | |
| 2003/0002481 A1 | 1/2003 | Laursen et al. | |
| 2004/0120502 A1 | 6/2004 | Strathmeyer et al. | |
| 2005/0141479 A1 * | 6/2005 | Ozugur et al. | 370/351 |

(Continued)

FOREIGN PATENT DOCUMENTS

| | | |
|---|---|---|
| EP | 1113655 A2 | 7/2001 |
| EP | 1113655 A3 | 7/2003 |
| EP | 1113655 B1 | 11/2006 |
| KR | 1020030083843 A | 11/2003 |

OTHER PUBLICATIONS

PCT International Search Report, filed Sep. 14, 2007, International Application No. PCT/US2007/078546, Mail Date Mar. 26, 2009.

(Continued)

*Primary Examiner* — Mark Rinehart
*Assistant Examiner* — Christopher R Crompton

(57) ABSTRACT

A system for automatically routing calls in a voice-over-packet (VOP) environment at a customer's premises without using a private branch exchange (PBX) is provided. One embodiment of the system includes a VOP-signal monitoring component that can monitor an incoming packet-based data stream to identify VOP data that is associated with one or more voice communications, a packet-identification component that can identify packets that make up a communications stream, a destination-determination component that can identify a first target device that should receive the packets identified to make up the communications stream; and a routing component that can direct the packets to the first target device.

19 Claims, 2 Drawing Sheets

(56) References Cited

U.S. PATENT DOCUMENTS

| | | | |
|---|---|---|---|
| 2005/0180403 A1 | 8/2005 | Haddad et al. | |
| 2006/0023657 A1* | 2/2006 | Woodson et al. | 370/328 |
| 2006/0215543 A1* | 9/2006 | Croak et al. | 370/216 |
| 2007/0076707 A1* | 4/2007 | Link et al. | 370/389 |
| 2007/0115923 A1* | 5/2007 | Denny et al. | 370/352 |
| 2007/0115940 A1* | 5/2007 | Kamen et al. | 370/352 |
| 2008/0046549 A1* | 2/2008 | Saxena et al. | 709/223 |
| 2009/0059939 A1* | 3/2009 | Anderson, IV | 370/401 |
| 2010/0265947 A1* | 10/2010 | Kokot et al. | 370/390 |
| 2011/0176540 A1* | 7/2011 | Rabenko et al. | 370/352 |

OTHER PUBLICATIONS

Notice of Allowance and Fee(s) Due, U.S. Appl. No. 11/531,864, Date Mailed: Apr. 1, 2011.

Non-Final Office Action, U.S. Appl. No. 11/531,864, Mail Date: Feb. 25, 2009.

Final Office Action, U.S. Appl. No. 11/531,864, Mail Date: Sep. 10, 2009.

Non-Final Office Action, U.S. Appl. No. 11/531,864, Mail Date: Nov. 25, 2009.

Non-Final Office Action, U.S. Appl. No. 11/531,864, Mail Date: Sep. 7, 2010.

* cited by examiner

VOP (VOICE OVER PACKET) AUTOMATIC CALL DISTRIBUTION

CROSS-REFERENCE TO RELATED APPLICATIONS

This application is a continuation of U.S. patent application Ser. No. 11/531,864, filed on Sep. 14, 2006, the entirety of which is incorporated by reference herein.

BACKGROUND

A PBX is a Private Branch Exchange, which is sort of like having a switch or central office located at a customer's premises (on or about a customer's physical location). In a circuit-based system, a PBX would provide various functional aspects such as routing calls and providing connectivity to the outside world. But they are often very expensive and can cost in the hundreds of thousands of dollars to purchase, install, etc.

But an analog PBX designed to be operated in a circuit-based network will not function in a packet-based network. VOP (voice over packet) is a term associated with a packet-based network environment that allows voice communications to occur utilizing a packet-based rather than a switch-based network.

Customers can reap benefits from using VOP technology to make and receive telephone calls because providing telephone service via VOP is often less expensive than the traditional service that utilizes the PSTN and is heavily regulated. But in such a setting, a customer may want features that have traditionally been offered in a PSTN environment via a PBX, but that are not available in a VOP environment because of the stark technological differences between a packet-based environment (VOP) and a circuit-based environment (PSTN). Moreover, customers may desire such functionality without having to buy a PBX, even one that might be able to work in a packet-based environment; that is, on the customer side—between the PBX and all the individual endpoints—rather than on the network side.

SUMMARY

The present invention is defined by the claims below, not this summary. Embodiments of the present invention provide a system, method, and product for, among other things, forgoing a PBX while providing an on-site device that operates in a VOP environment to offer automatic-call-distribution (ACD) functionality.

In a first aspect, a computer program product for performing a method of automatically routing calls in a voice-over-packet (VOP) environment without using a private branch exchange (PBX) is provided. An embodiment of the method includes monitoring an incoming packet-based data stream to identify VOP data that is associated with one or more voice communications, identifying packets that make up a communications stream, identifying a first target recipient who should be the object of the communications stream, and routing packets associated with the communications stream to the first target recipient.

In a second aspect, an apparatus for automatically routing calls in a voice-over-packet (VOP) environment at a customer's premises without using a private branch exchange (PBX) is provided. An embodiment of the apparatus includes a VOP-signal monitoring component that can monitor an incoming packet-based data stream to identify VOP data that is associated with one or more voice communications, a packet-identification component that can identify packets that make up a communications stream, a destination-determination component that can identify a first target device that should receive the packets identified to make up the communications stream, and a routing component that can direct the packets to the first target device.

In a final illustrative aspect, an automatic-call-distribution (ACD) device that is capable of operating in a packet-based environment is provided. One embodiment includes a monitoring component that monitors a signal communicated in a packet-based protocol wherein at least a portion of the signal includes data associated with at least one of a plurality of voice communications, a destination-determination component that identifies a set of target devices and a corresponding order of precedence as to who is to receive the data; and a routing component that routes the data to a first entity in the set of target recipients, and that facilitates rerouting the data to each other target recipient in the set according to the corresponding order or precedence incident to failing to connect to an attempted entity.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ACD | Automatic Call Distribution |
| ATM | Asynchronous Transfer Mode |
| CATV | Cable Television |
| IP | Internet Protocol |
| MGCP | Media Gateway Control Protocol |
| PSTN | Public Switched Telephone Network |
| SIP | Session Initiated Protocol |
| VoIP | Voice Over Internet Protocol |
| VOP | Voice Over Packet |

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a computer, and various other network devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
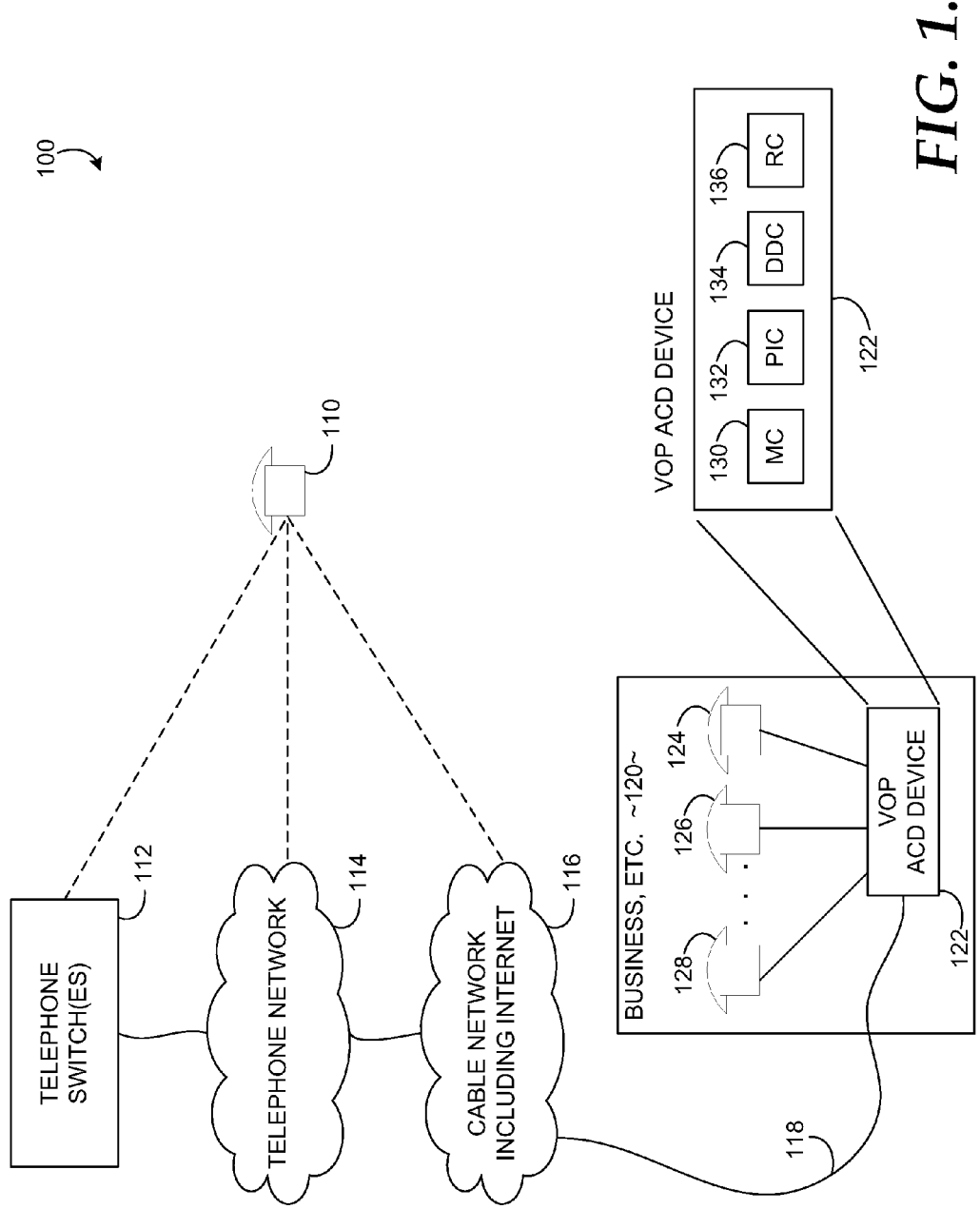
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. Operating environment 100 depicts an illustrative high-level overview of communicating across one or more networks that include voice-over-packet (VOP) technology. A variety of different communications devices, in addition to those illustratively shown, could be used in connection with operating environment 100 but are not shown so as to not obscure the present invention.

But by way of example, a calling party, represented by reference numeral 110, can be coupled to one or more of a telephone switch or switches 112, a telephone network 114, and/or a cable network including the Internet (or portion thereof) 116 via more and more communications lines 118 to a business, apartment, hotel, etc., referenced by numeral 120. Dotted lines are shown between calling party 110 and telephone switches 112, telephone network 114, and cable network 116 to indicate that a calling party may be coupled directly to one of the technologies or possibly to other technologies or even a combination of the same.

Telephone switches 112 ultimately provide dial tone in some embodiments to endpoints. Although there may be a variety of devices in between the device and the telephone switches, a telephone switch or a central office will be used to determine or help determine call routing in an embodiment of the invention.

Telephone network 114 may also be used in various embodiments of the present invention. An illustrative telephone network includes the PSTN (public switched telephone network).

Cloud 116 is denoted to refer to a cable communications network, such as a cable television (CATV) communications network. In some embodiments, such a CATV network may include a portion of the Internet, which is collectively represented by numeral 116. In an embodiment of the present invention, network 116 includes packet-based technologies that will be used to provide connectivity between telephones of entity 120 and one or more other calling or called parties, represented by numeral 110.

Line 118 is coupled to a voice-over-packet automatic call distribution (VOP ACD) device 122. ACD device 122 is ultimately coupled to a plurality of endpoints denoted by reference numerals 124, 126, and 128. Although not shown, in some embodiments, other devices or components of devices may be present between ACD device 122 and endpoints 124-128. For example, a cable modem may sit between ACD device 122 and an endpoint. In some embodiments, a cable modem translates a VOP signal to an analog signal so that endpoint 124 can be a conventional telephone. In other embodiments, the functionality offered by a cable modem is integrated into endpoint 124. In still other embodiments, endpoint 124 is a VOP-compatible phone that can be coupled to ACD device 122.

Another component that is not shown so as to not obscure the present invention is a distribution panel or a series of splitters between ACD device 122 and endpoints 124-128. A distribution panel or a series of splitters may be used to divide a signal or set of signals communicated via line 118 to the various endpoints, which, of course, can be more than three, even on the order of hundreds or thousands of devices.

An exploded view of ACD device 122 is also shown on FIG. 1 but is given the same numeral so as to indicate that the view is merely an expanded view of an illustrative VOP ACD device. In one embodiment, ACD device 122 includes a monitoring component 130 that monitors an incoming packet-based data stream to identify VOP data that is associated with one or more voice communications. For example, a number of voice communications can be communicated in a packet-based protocol along with other data via line 118 (which may represent multiple communications lines). Monitoring component 130 can monitor all of these various signals or monitor a specific type of signal. Similar functionality is offered by cable modems. Thus, monitoring component 130 may be configured to monitor a certain frequency of signals wherein such a frequency corresponds to VOP data. In this way, voice data may be distinguished from other types of data.

Another illustrative component that may be a part of ACD device 122 includes a packet identification component 132. Packet identification component 132 identifies packets that make up a communications stream. In some embodiments, multiple phone calls may be translated into packet-based data and sent over line 118. The various packets may correspond to respective voice calls. Thus, packet identification component 132 identifies packets that respectively compose a communications stream.

A device determination component 134 determines a destination device or recipient who should be the object of a voice communications. For example, a telephone call may supposed to be routed first to endpoint 124. Data determination component 134 would identify packets that should be routed to endpoint 124 based on the header information or other type of information included in the incoming data stream. Device determination component 134 may determine routing based on a target device or a target recipient. That is, it may identify a person who should receive the communications stream, and then determine a device associated with the person or it may merely determine an endpoint device that is the target of a communications stream.

A routing component 136 routes packets associated with a communications stream to a target recipient. As will be explained in greater detail below, calls may be routed to a first target recipient, but if that recipient is not available, then routed to a different recipient according to a set order or based on input received via a calling party such as calling party 110.

VOP ACD device 122 is placed at a customer's premises. That is, the ACD device is located on or about the geographical location of the business. Illustrative businesses include an apartment complex, a motel, a hotel, a resort, or any establishment that includes a number of endpoints or telephones that are to be provided with voice calling functionality.

The components shown in FIG. 1 may not be discrete or individual components as shown. Some may be merged together or known by different names. Accordingly, although different names may be attributed to different components in the business or industry, such potentially diversely named components should be evaluated according to the functionality that they offer to determine if they correspond to the components described herein.

Entity 120 will normally not include an entity that does not have a need for automatic call distribution, or the automatic routing of the calls to different recipients where there was only one recipient. For example, in many residential applications, there is only a signal phone line associated with a residence. In such an environment, there would be no need to make a determination as to who should receive an incoming call, and thus such devices and such uses are not germane to the instant invention.

Figure 2:
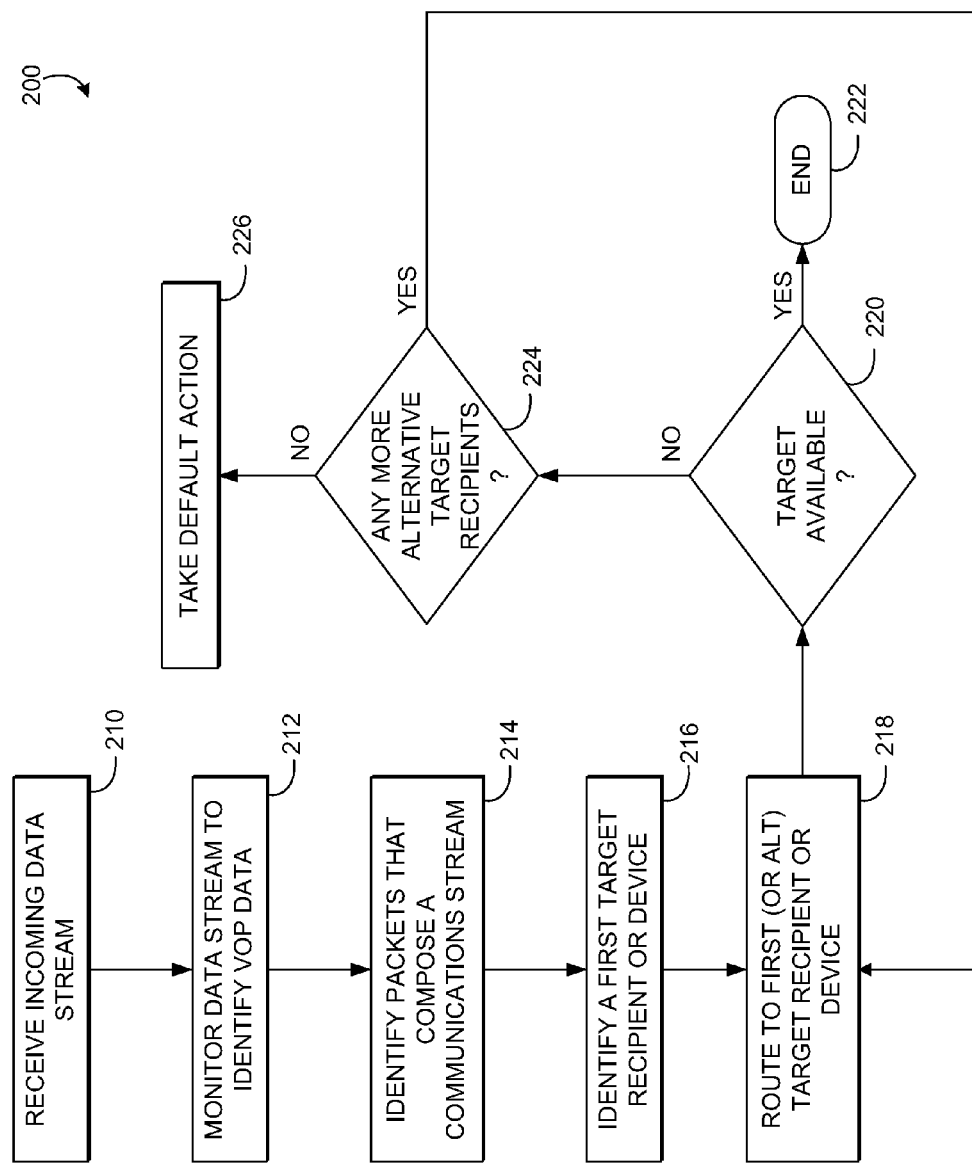
FIG. 2 depicts an illustrative method for providing ACD functionality according to an embodiment of the present invention.

Turning now to FIG. 2, an illustrative method for automatically routing calls in a VOP environment without using a private branch exchange is provided and referenced generally by the numeral 200. At a step 210, an incoming data stream is received. This incoming data stream is a packet-based data stream. As previously mentioned, some PBX devices are currently being referred to as VOP or VIP PBX devices. But such devices tend to be packet-based intracompany. That is, they are packet-based from the PBX to the different handsets. But in the instant invention, an actual packet-based data stream is received by the ACD device 122. Illustrative packet-based protocols include versions of the Internet protocol (IP), asynchronous transfer mode (ATM), session initiated protocol (SIP), media gateway control protocol (MGCP), megaco, and H.323. Clearly, other packet-based protocols exist, but these few are listed as illustrative of the various types of packet-based protocols in use or that may become in use. The incoming data stream may be associated with one or more voice communications. For example, they could be related to a single telephone call or a conference call, wherein multiple voice communications streams are to be extended to various endpoints, such as endpoints 124-128.

At a step 212, the data stream is monitored to identify VOP data. As previously mentioned, one way of identifying such VOP data is to monitor a frequency associated with that data. Data transmitted or received at a certain frequency may be associated with VOP data. In an alternative embodiment, VOP data may be denoted by information stored in the header of packets. For example, a specific portion of a data structure of a packet may denote whether data is of a certain type, such as voice data or another type of data. In such a scenario, that field or fields could be read to determine whether the data relates to VOP data.

At a step 214, packets are identified that compose a communications stream. As previously mentioned, it may be the case that multiple telephone conversations are sent through a single communications channel. In such a case, each telephone call may correspond to a respective communications stream. And in such a scenario, a communications stream may be made up of individual packets. Thus, at a step 214, individual packets that make up a communications stream are identified so that they can be directed to a proper destination.

At a step 216, a first target recipient or device is identified. In one of the embodiments of the present invention, a functional aspect offered is to be able to automatically route calls to certain recipients. Thus, for example, a first target recipient may be an attorney at a law firm. If the attorney is unavailable, then an alternative recipient may be his or her assistant. If the assistant is unavailable, then an alternative recipient may be a receptionist. If the receptionist is unavailable, then a default action may occur, such as routing to the original person's voicemail box. Thus, at a step 216, a first target recipient is identified. This may be a person or a device. That is, in one embodiment, VOP data may indicate a person desired to be contacted. If such is the case, then a determination can be made as to which device corresponds to that person so that the data can be properly routed. In other embodiments, data may indicate a device directly.

At a step 218, the VOP data or constituent packets are routed to the first target recipient or device. Thus, carrying out the previous example, the call might be routed directly to an attorney. Although not shown, a potential step after step 218 may be a determination whether automatic call distribution is even applicable. That is, a determination may be made before or after step 218 as to whether a call should even be automatically routed. Assuming automatic-call-distribution applies, processing advances to a step 220, which indicates a processing branch.

At a step 220, if the target recipient is available, then processing may end at a step 222. This would be the situation if the attorney answers his or her phone. But if the target recipient is unavailable, then processing may advance to another potential branch, indicated by reference numeral 224. In branch 224, ACD device 122 may make a determination as to whether there are any more alternative target recipients who have not yet been tried. If so, then processing will revert to step 218, wherein the communications stream or packets that compose the stream will be routed to the next alternative target. An illustrative next alternative target may be the attorney's assistant in this prophetic example.

Assuming that the assistant is not available at step 220, and a determination is made as to whether there are any more alternative target recipients at step 224, and further assuming that there are no more alternative target recipients, then in one embodiment processing may advance to a step 226 where a default action is taken. Illustrative default actions may include rolling the call over to the initial recipient's voicemail or directing the call to a switchboard.

Although the example just described contemplated a predetermined list and an order of precedence that should be followed when determining target recipients, it is also contemplated within the scope of the present invention that user intervention may preempt or dictate an alternative order or a target recipient directly. For example, a caller 110 may be prompted as to whom he or she desires to reach. Based on the input, the call may be directed to that person. In another example, after learning that the attorney is unavailable, a user may be prompted to indicate whether he or she wishes to be routed to voicemail directly or to the person's assistant. Based on input received from a caller, ACD device 122 will route the call accordingly.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. For example, device 122 offers capability to be able to program routing according to a customer's application. A user may program a series of recordings that the an incoming caller would hear. For example, if a called party does not answer, and no other person is available, the call may be rolled over to a recording indicating that the person is not available. As mentioned above, if a prompt may be provided to receive an indication from the caller as to whether he or she would like to speak to someone else, and if so to receive an indication of the same. Device 122 could provide audible instructions to a caller. Not all steps listed in the various figures need be carried out in the specific order described.

The invention claimed is:

1. An apparatus for automatically routing calls in a voice-over-packet (VOP) environment at a customer's premises without using a private branch exchange (PBX), the apparatus comprising:
   a monitoring component located at the customer's premises configured to monitor packets of an incoming packet-based data stream to identify VOP data, wherein the incoming packet-based data stream includes a plurality of data types, wherein the VOP data is identified from within the incoming packet-based data stream based at least in part on a frequency of the VOP data, and wherein the VOP data is associated with one or more voice communications, wherein the customer's premises comprises a plurality of target recipients;
   a packet-identification component located at the customer's premises configured to identify packets that compose a voice communications stream, wherein the packets are associated with a packet-based protocol that includes a version of one or more of asynchronous transfer mode, session initiated protocol, media gateway control protocol, Megaco, and H.323;
   a device-determination component located at the customer's premises configured to determine a first target recipient of the plurality of target recipients at the customer's premises who should be the object of the voice communications stream; and
   a routing component at the customer's premises that routes packets that compose the voice communications stream to the first target recipient.

2. The apparatus of claim 1, wherein the device-determination component further determines a first target device associated with the first target recipient and the routing component routes packets that compose the voice communications stream to the first target device.

3. The apparatus of claim 1, wherein the routing component is further configured, if the first target recipient is unavailable, to route packets that compose the voice communications stream to at least one additional target recipient.

4. The apparatus of claim 3, wherein the at least one additional target recipient is determined according to a set order.

5. The apparatus of claim 3, wherein the at least one additional target recipient is determined based on input from a calling party.

6. The apparatus of claim 3, wherein the destination-determination component is further operable to identify a serial set of one or more alternative target recipients at the customer's premises that should receive the voice communications stream.

7. The apparatus of claim 1, wherein the monitoring component is configured monitor a frequency of the incoming packet-based data stream to identify the VOP data.

8. The apparatus of claim 1, wherein the VOP data includes data that makes up a phone call or conference call.

9. An automatic-call-distribution (ACD) device at a customer's premises that is capable of operating in a packet-based environment, the device including:
   a monitoring component configured to monitor a data structure of an incoming packet-based-data stream to identify the VOP data, wherein the incoming packet-based data stream includes a plurality of data types and wherein the VOP data is identified from within the incoming packet-based data stream based at least in part on a frequency of the VOP data;
   a destination-determination component configured to identify a set of target recipients and a corresponding order of precedence as to who is to receive the data; and
   a routing component that routes the packets to a first entity in the set of target recipients, and that facilitates rerouting the packets at the customer's premises according to the corresponding order or precedence incident to failing to connect to an attempted entity, wherein the routing component routes the packets and facilitates rerouting the packets without using a private branch exchange.

10. The device of claim 9, wherein the destination-determination component is operable to have the order of precedence overridden by input received from a calling party.

11. The device of claim 9, wherein identify a set of target recipients at the customer's premises comprises identifying one or more devices associated with the set of target recipients.

12. The device of claim 9, wherein the monitoring component, the destination determination component, and the routing component are located on or about the customer's premises.

13. The device of claim 9, wherein the routing component is operable to take a default action incident to failing to connect to the set of target recipients.

14. One or more non-transitory computer readable storage medium, encoded with instructions capable of being executed by a computer embodied thereon for performing a method of automatically routing calls in a voice-over-packet (VOP) environment without using a private branch exchange (PBX), the method comprising:
   receiving an incoming packet-based data stream by a VOP automatic call distribution (VOP-ACD) device located at a customer's premises;
   monitoring the incoming packet-based data stream to identify VOP data, wherein the incoming packet-based data stream includes a plurality of data types, and wherein the VOP data is identified from within the incoming packet-based data stream based at least in part on a frequency of the VOP data;
   identifying packets that compose a voice communications stream;
   identifying a first target recipient of the communications stream at the customer's premises; and
   routing the packets associated with the communications stream to the first target recipient at the customer's premises.

15. The one or more non-transitory computer readable storage medium of claim 14, wherein identifying the first target recipient comprises identifying a first device located on or about the customer's premises and associated with the first target recipient.

16. The one or more non-transitory computer readable storage medium of claim 14, the method further comprising:
   if the first target recipient is unavailable, identifying a set of alternative target recipients and routing the packets associated with the communications stream to a next alternative target.

17. The one or more non-transitory computer readable storage medium of claim 14, the method further comprising:
   if the first target recipient is unavailable, routing the packets associated with the communications stream to an alternative target selected by a calling party.

18. The one or more non-transitory computer readable storage medium of claim 14, wherein the packets that compose the communications stream are identified from header information included in the incoming packet-based data stream.

19. The one or more non-transitory computer readable storage medium of claim 14, wherein the received packets have a first format according to a first packet-based protocol and routed packets are in the first format according to the first packet-based protocol.

* * * * *